United States Patent [19]

Gardiner

[11] Patent Number: 4,464,216
[45] Date of Patent: Aug. 7, 1984

[54] COMPOSITE NEGATOR SPRINGS

[75] Inventor: Richard J. Gardiner, Murray, Utah

[73] Assignee: Hercules Incorporated, Wilmington, Del.

[21] Appl. No.: 362,204

[22] Filed: Mar. 26, 1982

[51] Int. Cl.³ .................................. B32B 31/00
[52] U.S. Cl. ........................... 156/162; 156/163; 156/165; 156/184; 156/289; 156/446; 264/229; 267/148; 267/149; 267/167
[58] Field of Search ............. 156/184, 443, 162, 163, 156/165, 161; 264/229-231; 267/167, 166, 149

[56] References Cited

U.S. PATENT DOCUMENTS

| | | | |
|---|---|---|---|
| 2,656,178 | 3/1946 | Hughes, Jr. | 267/1 |
| 2,670,198 | 11/1951 | Glaser et al. | 267/1 |
| 2,811,201 | 7/1951 | Reid, Jr. | 160/122 |
| 2,899,191 | 7/1956 | Foster | 267/1 |
| 2,899,193 | 7/1956 | Foster | 267/1 |
| 3,379,283 | 4/1968 | Cole | 185/37 |
| 3,432,373 | 3/1969 | McMahon | 156/184 |
| 3,712,421 | 1/1973 | Hadfield | 185/37 |
| 3,812,933 | 5/1974 | Darda | 185/37 |
| 4,260,143 | 4/1981 | Kliger | 267/166 X |
| 4,265,690 | 5/1981 | Lowenhar | 264/229 X |
| 4,289,168 | 9/1981 | Lecourt et al. | 138/109 |

FOREIGN PATENT DOCUMENTS 2056615 3/1981 United Kingdom .

OTHER PUBLICATIONS

Letter from J. R. Douglass, Contract Administrator Dated Nov. 5, 1979, and Distribution List.

Primary Examiner—David A. Simmons
Attorney, Agent, or Firm—Edmund C. Ross, Jr.

[57] ABSTRACT

A composite spring comprising coaxially coiled sheet in which filamentary materials spiral about a first rotational axis of the spring in performed resinous convolutes. A method of fabricating a coaxial composite spring having filamentary materials that spiral about a first rotational axis of the spring in preformed resinous convolutes comprising wrapping a plurality of sheets including a release sheet about a mandrel wherein the sheets comprise the filamentary materials and hardenable resin.

20 Claims, 7 Drawing Figures

COMPOSITE NEGATOR SPRINGS

BACKGROUND OF THE INVENTION

1. Field of Use

This invention relates to a spring comprising a coaxially coiled sheet of filamentary materials and hardened resin. The filamentary materials naturally spiral around a first rotational axis of the spring in its relaxed state. Convolutes of the hardened resin carry these filamentary materials around such axis in conformity with this preformed curvature.

This invention also relates to manufacture of these springs as well as their application in simple and complex negator B motors.

2. Prior Art

When a spring of the type contemplated by this invention is relaxed, it comprises a sheet that coils coaxially around a first rotational axis in conformity with its preformed curvature. When, however, the sheet coils around a second, parallel to the first, rotational axis in a manner that is inconsistent with this preformed curvature, the spring stores energy. When the sheet is allowed to return to around the first axis, it releases this energy predominately by imparting torque around the second rotational axis. Such coiling and uncoiling about first and second rotational axes describes the action of negator B spring motors.

The method of making springs of this invention differs from that of certain analogous springs made of steel or other such high strength materials. Such prior art methods typically cause plastic deformation of the metal in the sheets during manufacture of the springs. This plastic deformation changes the nature of the metal in providing an inherent curvature to the spring coils.

Comparable plastic deformation does not occur in making springs of this invention. In addition, springs of this invention advantageously are free of corrosion and have lower inertia as compared to steel or like springs of the prior art. Moreover, they may be readily fabricated to have diverse, select spring characteristics.

OBJECTS OF THE INVENTION

It is an object of this invention to provide a composite spring comprising a coaxially coiled sheet of filamentary materials and hardened resin.

It is an object of this invention to provide such a spring in which the filamentary materials spiral from around a first rotational axis of the spring in preformed resinous convolutes of the sheet.

It is an object of this invention to provide such a composite spring wherein the filamentary materials are of diverse strain character for enhanced functioning of the spring.

It is an object of this invention to provide such a composite spring wherein the filamentary materials are selectively positioned in the resinous convolutes for enhanced functioning of the spring.

It is an object of this invention to provide such a spring wherein the filamentary materials are selectively located around the resinous convolutes for enhanced functioning of the spring.

It is an object of this invention to provide a method for fabricating any of these or other such springs.

It is an object of this invention to provide such a method using sheets of filamentary materials and hardenable resin.

It is an object of this invention to provide a negator B motor which employs these springs.

These and still other objects have been accomplished in accordance with this invention and this will be seen in the following disclosure.

BRIEF SUMMARY OF THE INVENTION

The coil spring of this invention incorporates continuous filamentary materials. The filamentary materials spiral around a first rotational axis of the spring. A convoluted sheet of hardened resin contains these filamentary solids in coaxial coils. The resinous convolutes can be coaxially coiled around a second rotational axis, inconsistent with the preformed curvature of the relaxed state of the spring, in energizing a negator B motor.

A composite spring of this invention can have convolutes of select thicknesses. A spring of this invention can have diverse filamentary material. A spring of this invention can have selectively located or positioned filamentary materials. The filamentary materials in this latter spring are located selectively across, around or through the resinous convolutes.

The method of this invention is for fabricating composite coil springs such as these. The method comprises providing a plurality of sheets wherein a first of the plurality of sheets comprises hardenable resin, preferably thermosetting resin, and filamentary materials disposed angularly to a first sheet first axis in the plane of the first sheet. A second of the plurality of sheets is releasable from the cured product of the hardenable resin. The first and second of sheets are fixed relative to a precursor axis that becomes the aforementioned first rotational spring axis after hardening of the hardenable resin such that an end portion of the first sheet adjacent the precursor axis is juxtaposed an end portion of the second sheet either atop the other with the first sheet first axis being parallel to the precursor axis. Remainder portions (i.e. portions of the sheets remote from the end portions at a location away from the precursor axis) of the first and second sheets are caused to wrap about the precursor axis. The wrapping is such that a second axis in the plane of the first sheet that is normal to the first sheet first axis spirals around the precursor axis substantially in a plane that is normal thereto. Rotation of a mandrel having the end portions of the sheets fixed thereto can cause the wrapping.

The method of this invention includes fabrication of a hybrid filamentary composite spring in which outer sections of the sheet comprise filamentary materials of a first strain character and the inner section comprises filamentary materials of a second strain character. The method of this invention also includes fabrication of variable thickness composite springs by fixing an uncured sheet relative to the precursor axis after the aforementioned plurality of sheets begin to wrap about the precursor axis. This variable thickness spring can also be a hybrid filamentary composite spring.

BRIEF DESCRIPTION OF THE DRAWINGS

FIG. 6 is a representation generally taken at 6—6 of FIG. 5.

DETAILED DESCRIPTION OF PREFERRED EMBODIMENTS OF THE INVENTION

Figure 1:
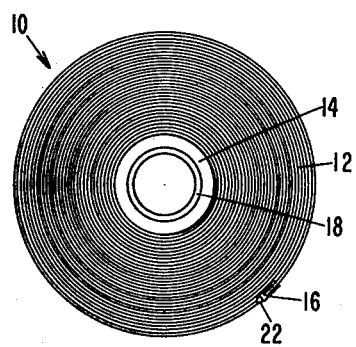
FIG. 1 illustrates in a top plan view a composite coil spring assembly of this invention.

Coil spring assembly 10 of FIG. 1 comprises composite sheet 12 which coaxially coils tightly around hollow tubular member 14. Composite sheet 12 is held on tubular member 14 by the tension of the coils. Composite sheet 12 terminates in end attachment group 16.

Composite sheet 12 is made of filamentary materials in a hardened resin matrix. Tubular member 14 and attachment group 16 are made of metal but may comprise composite materials such as filamentary graphite materials in thermoset epoxy resin.

Hollow tubular member 14 of coil spring assembly 10 has bearing wells spaced at either end. Bearing well 18 is shown in FIG. 1, the other well not shown. Cylindrical bearings (not shown) fit in these wells. Spring assembly 10 mounts rotatably to a spring storage tubular shaft around the bearings. The bearings permit free rotation of coil spring assembly 10 around first rotational axis 20 thereof.

Figure 7:
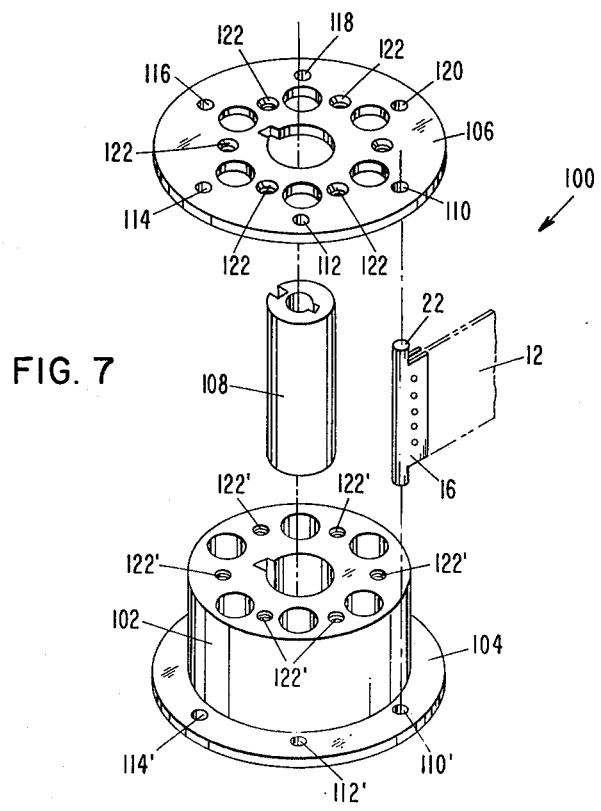
FIG. 7 illustrates a bushing assembly for use in making a negator B motor drive shaft section such as could be employed in the device depicted in FIG. 6.

End attachment group 16 has opposing plate members which bond on either side of the end of sheet 12. The plate members welded to solid rod 22 which serves to connect coil spring assembly 10 to a rotatable output bushing (FIG. 7).

Figure 3:
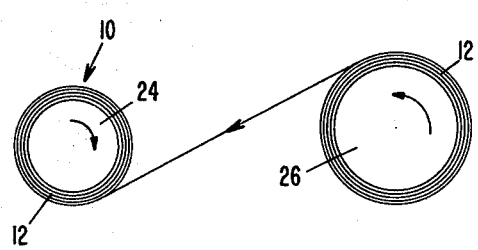
FIG. 3 schematically illustrates operation of the coil spring assembly as a negator B-motor.

FIG. 3 schematically illustrates coil spring assembly 10 of FIG. 1 operating in a simple negator B-motor. Spring assembly 10 is mounted to storage bushing 24 and, in conjunction with output bushing 26, defines the negator B-motor. Reverse winding of composite sheet 12 coaxially around output bushing 26 stores energy in tensioning and reverse bending of composite sheet 12. The winding is reverse because the radius of curvature of sheet 12 about output bushing 26 is opposite to the preformed curvature of composite sheet 12 maintained on storage bushing 24. When composite sheet 12 is allowed to return to its relaxed state, sheet 12 imparts torque to output bushing 26 causing output bushing 26 to rotate in the direction indicated in FIG. 3. The rotation of output bushing 26 is in the direction which sheet 12 winds about storage bushing 24, also as indicated.

When composite sheet 12 is of uniform cross-section, then the torque normally diminishes as sheet 12 returns to its relaxed state in view to the inherent increasing radius of the outer wraps of sheet 12. When sheet 12 is fabricated to compensate for this increasing radius of curvature, e.g. has a thickness that increases with increasing radius, then such variable thick sheet can give constant or nearly constant torque to output bushing 26.

Figure 4:
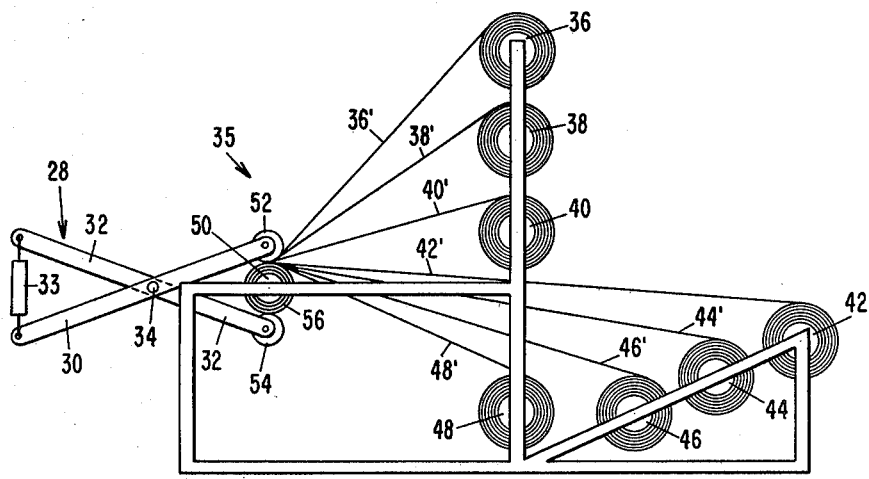
FIG. 4 illustrates schematically the winding operation used making a coiled sheet member, such as the coiled sheet member of FIG. 1, for a composite coil spring of this invention.

FIG. 4 schematically illustrates the method in which sheet 12 is made in accordance with this invention.

Spring wrapping fixture 35 in FIG. 4 carries a plurality of tensionable spools 36, 38, 40, 42, 44, 46, and 48. Rotatable mandrel 50 mounts between compaction rollers 52 and 54 on fixture 34. Compaction rollers 52 and 54 are hydraulically loaded and exert between them a constant total pressure of between about 50 and 150 psi on mandrel 50. Scissor device 28 has arms 30, 32 pivotedly mounted at pin 34 for applying such pressure to a first end of rollers 52 and 54 by means of hydraulically activated piston 33. Another scissor device (not shown) similarly applies pressure to the other end of rollers 52 and 54. Hydraulically activated piston forces arms 30,32 (and the other arms) apart in maintaining this pressure.

Spools 36, 38, 40, 42, 44, 46 and 48 respectively have sheets 36', 38', 40', 42', 44', 46' and 48' wrapped about them which are also fixed to mandrel 50. Sheet 48' is a release sheet. The sheets other than 48' have filamentary materials and hardenable resin that integrate together in forming the springs of this invention. The release sheet does not adhere to the hardened resin of the other sheets in the resulting springs.

The filamentary materials are preferably in thermosetting resin in sheets 36', 38', 40', 42', 44' and 46'. The filamentary materials are positioned in each of sheets 36', 38', 40', 42', 44' and 46' such that they extend in the respective sheets between each respective spool 36, 38, 40, 42, 44 and 46 and mandrel 50. The filamentary materials in each sheet are continuous and preferably extend parallel to the longitudinal axis within the plane of that sheet. Other filamentary materials in the sheets may, however, extend at any angles from the longitudinal axis in its respective sheet. In the extreme, only one sheet need have filamentary materials positioned other than perpendicular to the longitudinal axis of its sheet to make a spring of this invention.

As mandrel 50 rotates, it draws tensioned sheets 36', 38', 40', 42', 44', 46' and 48' around it. Compaction rollers 52 and 54 heat and press sheets 36', 38', 40', 42', 44', 46' and 48' together to form an integral partially hardened sheet 56 that coils about mandrel 50 with release sheet 48' spacing the coils of sheet 56.

Spring wrapping fixture 35 is also suited for making coiled, hybrid composite springs. For example, spools 36 and 46 can carry 10 mil thick sheets of S-2 glass fiber, spools 38 and 44 can carry 10 mil thick AS graphite fiber, and spools 40 and 42 can carry 5 mil thick sheets of graphite fiber in making a hybrid composite spring.

One or more coiled springs can be made using the apparatus depicted in FIG. 4 depending on the width of the sheets. For example, coiled sheet 56 may have the width of several springs. Coiled sheet 56 is cut radially through its center axis after cure to provide two (or more, as desired) coiled sheets.

Spring wrapping fixture 35 is also adaptable to provide variable thickness springs. Spools 40 and 42, for example, may be held in abeyance until a first amount of the other sheets are wound about mandrel 50. Then, sheets 40' and 42' are fixed to the other sheets. Mandrel 50 is then rotated and the remainder of the coiled sheet has a greater. Sheets accordingly may be added or deleted or both added and deleted in accordance with desired design specification of the resultant coiled sheet.

After completion of winding sheets 36', 38' 40', 42', 44', 46', and 48' about mandrel 50, shrink tape is wound about the resulting, partially hardened, spring preform. The partially spring preform is placed in an oven to cure the thermosetting resin. If, however, thermoplastic resin is used, the sheets carry molten resin which is hardened through pressure and chilling of compaction rollers 52 and 54.

Figure 5:
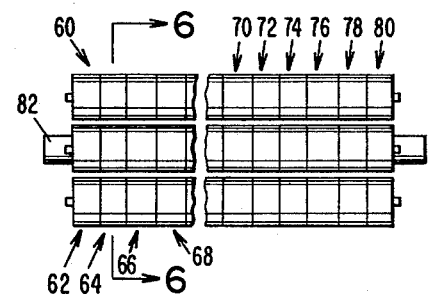
FIG. 5 depicts a complex negator B motor assembly in side elevation. The complex negator B motor utilizes banks of springs made by this invention.
Figure 6:
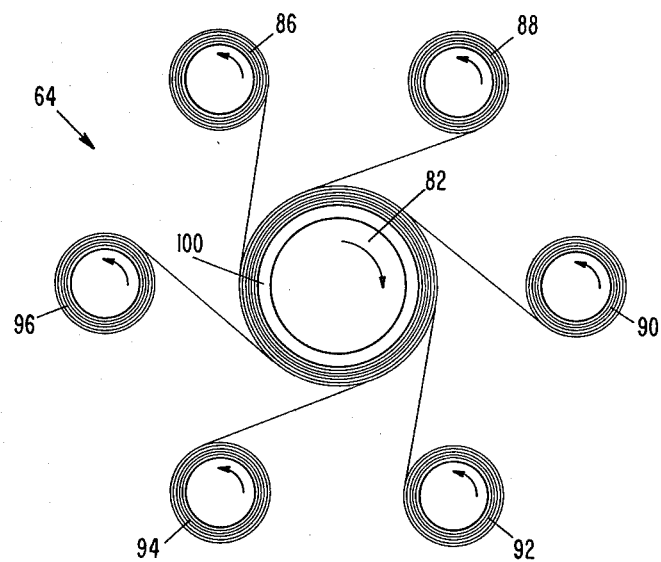
FIG. 6 depicts schematically a negator B motor bank from the assembly of FIG. 5.

FIGS. 5, 6 and 7 relate to the application of spring 10 in a negator B motor. FIG. 5 shows in a side elevation, partially broken away, complex negator B motor assembly 60. Complex negator B motor 60 has banks 62, 64, 66, 68, 70, 72, 74, 76, 78, 80 and still other such banks surrounding output shaft 82. The springs of each band mount rotatably around one of six storage bushing shafts, as will be more apparent in viewing FIG. 5 with FIG. 6.

FIG. 6 is a schematic view by negator B motor assembly 64 looking in at 6—6 of FIG. 5 and showing bank 64 thereof. Negator B motor bank 64 has six negator B motor springs 86, 88, 90, 92, 94 and 96. Negator B motor bank 64 is shown as energized in FIG. 6 whereby the sheets of springs 86 through 96 are wrapped about output shaft 82 around bushing assembly 100.

Bank 64 applies torque to output shaft 82 in the direction of the arrow shown in FIG. 6. In applying such torque, spring motors 86 through 96 rotate around their respective fixed shafts in the direction of the arrows shown.

Figure 2:
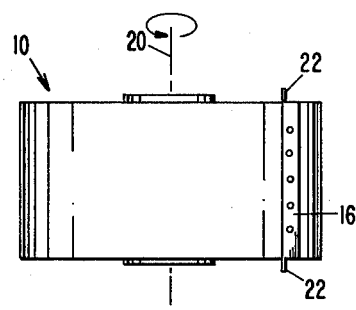
FIG. 2 is a side elevation view of the spring of FIG. 1.

Output bushing assembly 100 is shown in elevation in FIG. 7 together with attachment group 16 and a portion of sheet 12 (see also FIG. 1). Output bushing assembly 100 has bushing 102. Bushing 102 has integral flange 104. Flange 106 mounts to bushing 102 by means of a tubular key member (not shown). The tubular key member fixes cylindrical member 108 and flange 106 relative to bushing 102. At the same time integral rod 22 (FIGS. 1 and 2) fits into holes 110, 110' of flanges 104 and 106 as do other end attachment groups (not shown) of other spring sheets.

Rods of these other end attachment groups fit into holes 112, 114, 116, 118, and 120 of flange 106 and their respective counterpart holes of which 112' and 114' are depicted in FIG. 7. Then flange 106 is bolted to bushing 102 through holes 122, 122'. Tubular member 108 is then (or earlier) keyed into an output shaft such as 82 in FIG. 6.

EXAMPLES

Six hybrid composite springs were fabricated using the procedures discussed above wherein the filamentary materials were a combination of continuous graphite fibers and continuous glass fibers. The graphite fibers were Hercules Magnamite ® graphite fibers disposed unidirectionally in a graphite prepreg tape. The glass fibers were Ferro Corporation S-2 glass fibers disposed unidirectionally in a glass prepreg tape. The graphite and glass fibers were at a 0° angle in their respective tapes.

The resin content in the graphite prepreg tape was about 38% by weight plus or minus 3%. The resin content in the glass prepreg tape was 30% by weight plus or minus 4%.

The graphite tape had an average ply thickness of about 5.5 mils and a width of about 12 inches. The glass prepreg tape had an average ply thickness of between about 10 and 11 mils and a width of about 12 inches.

The resin of the glass prepreg tape and the resin of the graphite prepreg tape were epoxy resins that cured at 250° F. The release sheet material was Bleed Release 'B' available from Airteck.

A total of about 55–60 feet per ply of the glass prepreg tape and about 55–60 feet per ply of the graphite prepreg tape were used in fabricating each of the springs.

The tension of the spools carrying the glass prepreg tapes and carrying the graphite prepreg tapes varied between 10 and 60 psi. The temperature of compaction rollers 52 and 54 were respectively about 120° F. and 160° F. The pressure of compaction rollers 52 and 54 were respectively about 100 psi. Variations in the pressure were equipment limitations.

Spools 38, 40, 42 and 44 had the graphite prepreg tape. Spools 36 and 46 had the glass prepreg tape.

The theoretical torque for the springs used in a negator-B spring test device such as depicted schematically by FIG. 3 was determined to be $$T = \frac{Ebh^3 R_2}{24} \left( \frac{1}{R_1} + \frac{1}{R_2} \right)^2 \qquad I$$

from standard analysis wherein T is torque, E is elastic modulus of the spring, b is spring width, h is spring thickness, $R_1$ is the radius of the storage bushing and $R_2$ is the radius of the output bushing. The theoretical torque for each of the springs was computed to be about 51 ft/lbs. for 10 revolutions of the spring wherein the output bushing has a radius of 5.8 inches and the storage bushing has a radius of 2.2 inches. The actual torque was 47 ft/lbs. at these conditions as an average for the springs tested.

Variation in spring thickness (h) is believed to be a cause of the somewhat lower than theoretical outputs. A variation in thickness was due to greater compaction to the spring coils that are radially closer to the spring rotational axis during fabrication. The greater compaction arose due to the pressure of the radially outer coils winding about the radially inner coils.

The springs were tested to determine whether the end group 16 or sheet 12 would fail when Hysol EA-934 adhesive (available from Hysal/Dexter) was used to bond end group 15 to sheet 12 made as described above. In these cases, the failure was due to the adhesive bonding.

Springs that were made as described above were tested under dynamic conditions to measure the dynamic forces involved at the reaction point. In performing these tests, the spring was wound about an output bushing by means of a hand crank for a predetermined number of turns. An electromagnetic clutch then locked the output bushing in position. When the clutch was released, the spring fired. The springs failed similar to a control failure wherein the control was stainless steel. The dynamic test indicated that the springs should be released with a loaded storage bushing or with a storage bushing that has a larger diameter than the spring fabrication mandrel.

Springs were also fabricated using S-2 glass prepregs (available as 1908 resin from Hercules, Inc.) in place of the aforementioned Ferroglass prepregs. Analysis of void contents in the springs by coil location as follows:

| Location | Ferroglass | S-2 |
| --- | --- | --- |
| Outside | ~7% | ~4% |
| Middle | <0.5% | <0.5% |
| Inside | <0.5% | <0.2% |

The difference is believed due to a greater amount of resin in the S-2 glass prepreg per filaments thereof.

The thickness of springs fabricated with the Ferroglass was also examined with the following results:

| Coil | Average Thickness |
|------|-------------------|
| 1    | 43 mils           |
| 10   | 41 mils           |
| 20   | 42 mils           |
| 30   | 45 mils           |
| 40   | 47 mils           |

Using equation I, torque changes 7% by varying thickness 1 mil. The thickness also was variable in the sheet in a direction parallel to the rotational axis of the spring.

The aforedescribed variation from uniformity in thickness and resin content did not render the springs ineffective for their intended purpose.

What is claimed is:

1. A method of fabricating a coaxial composite spring having filamentary materials that spiral about a first rotational axis of said spring in a sheet of preformed resinous convolutes, said sheet being coilable about a second axis, parallel to said first axis, for energizing said spring, said method comprising:
   providing a plurality of spooled sheets wherein a first of said sheets comprises hardenable resin and filamentary materials disposed angularly to a first sheet first axis in the plane of said first sheet and a second of said sheets is releasable from the hardened product of said hardenable resin;
   fixing said first and second sheets relative to a precursor axis that becomes said first rotational axis after hardening of said hardenable resin such that an end portion of said first sheet adjacent said precursor axis is juxtaposed an end portion of said second sheet either atop the other with said first sheet first axis being parallel to said precursor axis;
   causing remainder portions of said first and second sheets remotely located from said end portions and away from said precursor axis to unwind and wrap together on themselves under tension about said precursor axis such that a first sheet second axis in the plane of said first sheet and normal to said first sheet first axis sprials around said precursor axis substantially in a plane that is normal thereto; and
   hardening said resin in the so wrapped sheets to provide said spring.

2. The method in accordance with claim 1, wherein said hardenable resin comprises a thermosetting resin.

3. The method in accordance with claims 1 or 2, wherein said filamentary materials lie along axes that are normal to said first sheet first axis in the plane of said first sheet.

4. The method in accordance with claim 3, wherein said filamentary materials comprise graphite fiber.

5. The method in accordance with claim 3, wherein said plurality of sheets comprises a third sheet comprising hardenable resin and filamentary materials that has an end portion between said sheet adjacent said precursor axis when fixed relative thereto.

6. The method in accordance with claim 5, wherein said filamentary materials of said first sheet comprise graphite fiber.

7. The method in accordance with claim 6, wherein said filamentary materials of said third sheet comprises glass fiber.

8. A method of fabricating a coaxial composite spring having hybrid filamentary materials that spiral about a first rotational axis of said spring in a sheet of preformed resinous convolutes, said sheet being coilable about a second axis, parallel to said first axis, for energizing said spring, said method comprising:
   providing a plurality of spooled sheets wherein a first of said sheets comprises hardenable resin and filamentary materials of a first character disposed angularly to a first sheet first axis in the plane of said first sheet, a third of said sheets comprises hardenable resin and filamentary materials of a second character disposed angularly to a third sheet first axis in the plane of said third sheet, and a second sheet is releasable from the hardened product of said hardenable resin of either of said first and third sheets;
   fixing said first, second and third sheets relative to a precursor axis that becomes said spring axial axis after hardening of said hardenable resin such that an end portion of said first sheet is between end portions of said second and third sheets that are juxtaposed either atop the other with said first and second sheet first axis parallel one another and said precursor axis;
   causing remainder portions of said first, second and third sheets remotely located from said end portions and away from said precursor axis to unwind and wrap together on themselves under tension about said precursor axis such that a first sheet second axis in the plane of said first sheet that is normal to said first sheet first axis and a third sheet second axis in the plane of said third sheet that is normal to said third sheet first axis, spirals around said precursor axis in a plane normal thereto; and
   hardening said resin in the so wrapped sheets to integrate all but said second sheet and provide said spring.

9. The method in accordance with claim 8, wherein said hardenable resins comprise a thermosetting resin.

10. The method in accordance with claim 9, wherein said filamentary materials of first character comprises graphite.

11. The method in accordance with claims 9 or 10, wherein said filamentary solids of second character comprises glass.

12. The method in accordance with claim 11, wherein said plurality of sheets comprises fourth and other sheets comprising thermosetting resin and filamentary solids.

13. A method of fabricating a composite spring having integral outer and inner layers that have differing strain limits, said spring having hybrid filamentary materials that spiral around a first rotational axis in a sheet of preformed resinous convolutes, said sheet being coilable about a second axis, parallel to said first axis, for energizing said spring, said method comprising:
   providing a plurality of spooled sheets comprising inner and outer sheets and a release sheet wherein a first, fourth and other, if any, sheets that are said outer sheets respectively comprise hardenable resin and filamentary materials of a high strain character that are disposed angularly to first, fourth and other, if any, outer sheet first axis in the respective planes of said outer sheets, a third and still other, if any, sheets that are said inner sheets respectively comprise hardenable resin and filamentary materials of a low strain character that are disposed angularly to third and still other, if any, inner sheet first axes in respective planes of said inner sheets, and a second sheet that is said release sheet and is releasable from the hardened product of said hardenable resin of said outer sheets that forms the resin surfaces of said spring;

fixing said inner, outer and release sheets relative to a precursor axis that becomes said spring axis after hardening of said hardenable resins such that end portions of said inner sheets are between end portions of said outer sheets and furthermore an end portion of said second sheet is juxtaposed under or over said first sheet opposite said inner sheets and still further said inner and outer sheet first sheet axes are parallel to said precursor axis;

causing remainder portions of said inner, outer and release sheets remotely located from said end portions and away from said precursor axis to unwind and wrap together on themselves under tension about said precursor axis such that outer sheet second axes that are in respective planes of said outer sheets and respectively normal to said first, fourth and other, if any, outer sheet first axes spiral around said precursor axis in a plane that is normal thereto and furthermore inner sheet second axes that are in respective planes of said inner sheets and respectively normal to said third and other, if any, inner sheet first axes also spiral around said precursor axis in said plane that is normal thereto; and hardening said resin in the so wrapped sheets to integrate all but said release sheet and provide said spring.

14. The method in accordance with claim 13, wherein said filamentary materials of said first character comprise glass.

15. The method in accordance with claim 13 or 14 wherein said filamentary materials of said second character comprise graphite fiber.

16. The method in accordance with claim 15, wherein said hardenable resin comprises thermosetting resin.

17. The method in accordance with claim 16, wherein filamentary materials of said first character extend along axes in the plane of said first sheet that are normal to said first sheet first axis.

18. The method in accordance with claim 13 or 14 which comprises fixing an additional sheet relative to said spring axis subsequent to causing the aforesaid wrapping about said precursor axis.

19. A sheet made in accordance with any of the methods of claims 1, 8 or 13.

20. A sheet in accordance with claim 19, wherein said filamentary materials include graphite filamentary materials.

* * * * *

UNITED STATES PATENT AND TRADEMARK OFFICE
CERTIFICATE OF CORRECTION

PATENT NO. : 4,464,216
DATED : August 7, 1984
INVENTOR(S) : Richard J. Gardiner

It is certified that error appears in the above–identified patent and that said Letters Patent are hereby corrected as shown below:

In the Abstract, line 1, insert " a " before -- coaxially --;

Col. 6, line 36, " group 15 " should read -- group 16 --.

Signed and Sealed this

Fifteenth Day of January 1985

[SEAL]

Attest:

GERALD J. MOSSINGHOFF

Attesting Officer

Commissioner of Patents and Trademarks